US006869193B2

(12) United States Patent
Belliveau

(10) Patent No.: US 6,869,193 B2
(45) Date of Patent: Mar. 22, 2005

(54) LIGHTING SYSTEM INCORPORATING PROGRAMMABLE VIDEO FEEDBACK LIGHTING DEVICES AND CAMERA IMAGE ROTATION

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 10/782,279

(22) Filed: Feb. 19, 2004

(65) Prior Publication Data

US 2004/0183901 A1 Sep. 23, 2004

Related U.S. Application Data

(63) Continuation of application No. 10/336,155, filed on Jan. 2, 2003, now Pat. No. 6,719,433.

(51) Int. Cl.[7] .................. G03B 21/00; G03B 21/26; H04N 9/12; H04N 5/64; H04N 9/31
(52) U.S. Cl. .................. 353/122; 353/94; 353/121; 348/383; 348/744
(58) Field of Search .................. 353/94, 121, 122; 348/383, 744

(56) References Cited

U.S. PATENT DOCUMENTS

| 5,828,485 | A | 10/1998 | Hewlett | 359/291 |
|---|---|---|---|---|
| 5,829,868 | A | 11/1998 | Hutton | 362/276 |
| 6,057,958 | A | 5/2000 | Hunt | 359/291 |
| 6,219,093 | B1 | 4/2001 | Perry | 348/135 |
| 6,219,099 | B1 * | 4/2001 | Johnson et al. | 348/383 |
| 6,310,650 | B1 * | 10/2001 | Johnson et al. | 348/383 |
| 6,561,651 | B1 * | 5/2003 | Kubota et al. | 353/30 |
| 6,605,907 | B2 * | 8/2003 | Belliveau | 315/294 |
| 2002/0093296 | A1 * | 7/2002 | Belliveau | 315/294 |
| 2003/0117090 | A1 * | 6/2003 | Belliveau | 315/368.28 |

OTHER PUBLICATIONS

Physical Review E, vol. 61, No. 4, Apr. 2000 titled "Farey Sequences of Spatiotemporal Patterns In Video Feedback" by Baptiste Essevaz–Roulet.
Catalyst System Brochure.

* cited by examiner

Primary Examiner—Judy Nguyen
Assistant Examiner—Melissa J Koval
(74) Attorney, Agent, or Firm—Walter J. Tencza, Jr.

(57) ABSTRACT

A lighting system is disclosed comprising a plurality of image projection lighting devices including a first image projection lighting device, a central controller, and a communications system which permits the central controller to communicate with the plurality of image projection lighting devices. The first image projection lighting device is comprised of a camera, and a light valve, wherein the light valve is used to project a first projected image onto a projection surface. The camera of the first image projection light device can capture at least a portion of the first projected image projected from the light valve to form a first captured image. At least a portion of the first captured image is projected as a second projected image by the first image projection lighting device onto the projection surface creating a video feedback loop.

11 Claims, 7 Drawing Sheets

LIGHTING SYSTEM INCORPORATING PROGRAMMABLE VIDEO FEEDBACK LIGHTING DEVICES AND CAMERA IMAGE ROTATION

CROSS REFERENCE TO RELATED APPLICATION(S)

This application is a continuation of and claims the priority of U.S. patent application Ser. No. 10/336,155, filed on Jan. 2, 2003, now U.S. Pat. No. 6,719,433 titled "LIGHTING SYSTEM INCORPORATING PROGRAMMABLE VIDEO FEEDBACK LIGHTING DEVICES AND CAMERA IMAGE ROTATION", inventor and applicant Richard S. Belliveau.

FIELD OF THE INVENTION

This invention relates to improved methods and apparatus concerning lighting systems.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter light fixture which is referred to herein as an image projection lighting device ("IPLD") uses a light valve to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, incorporated herein by reference, discloses the use of a camera with a digital micro mirror equipped light fixture for the purpose of following the shape of the performer and illuminating the performer using a shape that adaptively follows the performer's image. A camera capturing the image (such as a digital camera, which captures an image at least in part by storing digital data in computer memory, the digital data defining or describing the image) preferably is located at the lamp illuminating the scene in order to avoid parallax. The image can be manually investigated at each lamp or downloaded to some central processor for this purpose.

IPLDs of the prior art use light from a projection lamp that is sent though a light valve and focused by an output lens to project images on a stage or a projection surface. The light cast upon the stage by the IPLD is then imaged by the camera. U.S. Pat. No. 6,219,093 to Perry titled "Method and device for creating the facsimile of an image", incorporated herein by reference, describes a camera that may be an infrared camera for use with a described lighting device that uses liquid crystal light valves to project an image. "Accordingly the camera and light are mounted together for articulation about x, y, and z axes as is illustrated in FIG. 1" (Perry, U.S. Pat. No. 6,219,093, col. 4, line 59).

The prior art patent to Perry, U.S. Pat. No. 6,219,093 makes use of a camera to distinguish an object in the camera's field from other objects. The distinguished object as imaged by the camera is then illuminated by the projected light passing through the light valves so as to only illuminate the distinguished object. The object "objects" was mentioned in the Perry patent may be provided with an infrared emitter or reflector which interacts with a receiver or camera. The Perry prior art patent describes its invention as a camera/light unit.

In their common application, IPLDs are used to project their images upon a stage or other projection surface. The control of the IPLDs is affected by an operator using a central controller. In a given application, a plurality of IPLDs are used to illuminate the projection surface, with each IPLD having many parameters that may be adjusted by a central controller to create a scene. Once a scene is constructed, the operator of the central controller can adjust the parameters of the many IPLDs in order to construct a new scene. The work of adjusting or programming the parameters to the desired values for the many IPLDs to create a scene can take quite some time.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. The prior art content is typically comprised of still images, video images or loops and computer graphical images. There is always a need for more types of content that can be produced quickly or live and inexpensively and that can be continuously varied as to its final look on the projection surface.

Video feed back as a phenomena and an art form has been studied by many individuals for many years. In the simplest form a video camera is set up perpendicular to a video monitor screen with the purpose of capturing the image of the video monitor screen. The captured video signal from the camera imaging the video monitor screen is continuously fed into the video monitor to create a feedback loop. In order to induce the desired graphical feedback effects the camera is rotated on its axis or in some situations the monitor is turned on its side. In this way the image that is sent from the camera to the monitor during each loop is at a different rotational angle than the previous image. A explanation of the prior art of video feedback can be found in Physical Review E, Volume 64, Number 4, April 2000 titled "Farey Sequences of spatiotemporal in video feedback" by Baptiste Essevaz-Roulet and is incorporated herein for reference.

SUMMARY OF THE INVENTION

The present invention in a first embodiment provides an image projection lighting device which projects a first projected image onto a projection surface. The image projection lighting device typically includes an integral camera which captures a first captured image of at least a portion of the first projected image on the projection surface. The image projection lighting device may rotate the first captured image to form a second projected image. The second projected image may be projected onto the projection surface at a different rotational angle than the first image.

The first captured image may be electronically rotated by an image control system to create a second projected image. The rotation of the first captured image is used to create and vary live video feedback art on the projection surface as projected by the image projection lighting device.

The present invention in a second embodiment provides a lighting system which includes a first image projection lighting device with an integral camera which creates a live video feedback on a projection surface by using the first embodiment while transmitting the content of the live video feedback to a second image projection lighting device for projection on a projection surface.

In a third embodiment a scene stored in a memory of a central controller in a lighting system is retrieved from the memory. The scene causes one or more commands to be sent over a communication system to produce a particular video feedback.

In one or more embodiments a method is provided which typically includes electronically rotating a first captured image of a first projected image to form a second projected image. The first and second projected images are projected by an image projection lighting device that typically includes an integrated camera. The integrated camera is used to produce video feedback art on a projection surface. The method may be further comprised of capturing an image of the projection surface. The image may be captured by a camera integrated with an image projection lighting device. The first captured image of the projection surface is established by a camera field of the camera. The camera field of the camera can be located to capture images of the projected images on the projection surface as established by the projection field. Next the first captured image can be rotated in a desired manner to create the desired video feedback art that is projected, as a second projected image, for example, upon the projection surface. The IPLDs of one or more embodiments of the present invention can be controlled by an operator of a central controller over a communications system by first addressing a first IPLD of a plurality of IPLDs to be controlled. Next the operator of the central controller can cause the central controller to send one or more commands or command signals, commanding a first IPLD camera of the first IPLD to capture images of a current projection field. Next, the operator of the central controller can cause one or more commands or command signals to be sent, which cause the first IPLD to electronically rotate a current projected image upon a projection surface, to form a revised projected image, in a repeating loop, until the desired video feedback art, or desired projected image, is produced.

The command settings as commanded by the operator of the central controller when controlling the first IPLD can be recorded by the central controller and later recalled as a scene during a show to reproduce the desired video feedback or a series of desired projection images. A plurality of IPLDs can independently create video feedback art, or a series of desired projection images, upon the projection surface. As described in my pending application Ser. No. 10/090,926 titled "Method, apparatus and system for image projection lighting" filed Mar. 4, 2002, incorporated herein by reference, image content created by one IPLD camera can be transmitted, such as in the form of digital data to another IPLD for projection by sending the image content over a communication system between the IPLDs.

A performer may be located on a stage in front of the projection surface. A camera of a particular IPLD may capture an image of a projected image on the projection surface as projected by the IPLD with the performer located in a camera field of the camera between the IPLD and the projected image.

In this way the performer's image can also be captured by the camera. The performer's image can be incorporated into the video feedback art produced by the IPLD of the invention. It is also possible to mix content (such as video stills or animation) into the feedback art. The content as provided by memory of the IPLD or the content as provided over the communications system as received by the communications port of the IPLD may be simultaneously projected along with the video feedback art by an IPLD in accordance with one or more embodiments of the present invention. This produces a video feedback art, or series of projected images, that incorporates the content into the video feedback loop producing even more creative video feedback art.

Rotation of a camera image taken by a camera on an IPLD, even without consideration to video feedback, is a further novel aspect of one or more embodiments of the present invention.

DETAILED DESCRIPTION OF THE DRAWINGS

Figure 1:
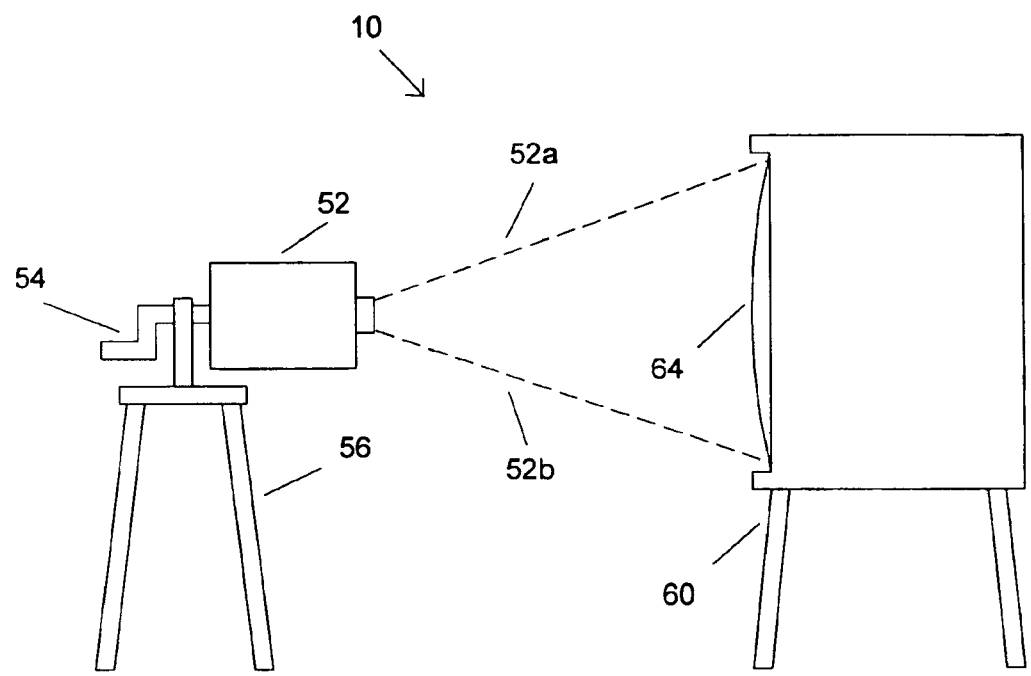
FIG. 1 shows a prior art video feedback system.

FIG. 1 shows a prior art video feedback system 10. The prior art video feedback system 10 includes a video camera 52 mounted to a crank handle 54 that is rotatably mounted to a tripod 56, so that the crank handle 54 can rotate with respect to the tripod 56 The crank handle 54 allows the camera 52 to be rotated on an optical axis of the camera 52. The camera 52 has it image field shown by dashed lines 52a and 52b. The camera 52 is centered to capture an image of the picture screen or the picture tube 64 of the monitor or television 60. The camera 52 is mounted to a tripod 56 so that the center of the optical field the camera 52 can be centered horizontally and vertically with the center of the picture tube 64. The camera's video output signal is routed with a video cable to the video input signal of the monitor 60 (not shown for simplification). The desired video feed back art is created when the camera's image field is rotated by physically rotating the camera 52 on its optical axis by using the crank handle 54. The camera 52 in the prior art may also use a motor (not shown) to rotate the camera 52 instead of a hand crank handle 54. Various other adjustments to the intensity, sharpness and hue of the monitor or television 60 may be made during the creation of live video feedback art as known in the art. Also the camera 52 may have various adjustments made to focus, zoom, and iris besides the rotation of the camera 52 on its optical axis as known in the art.

Figure 2:
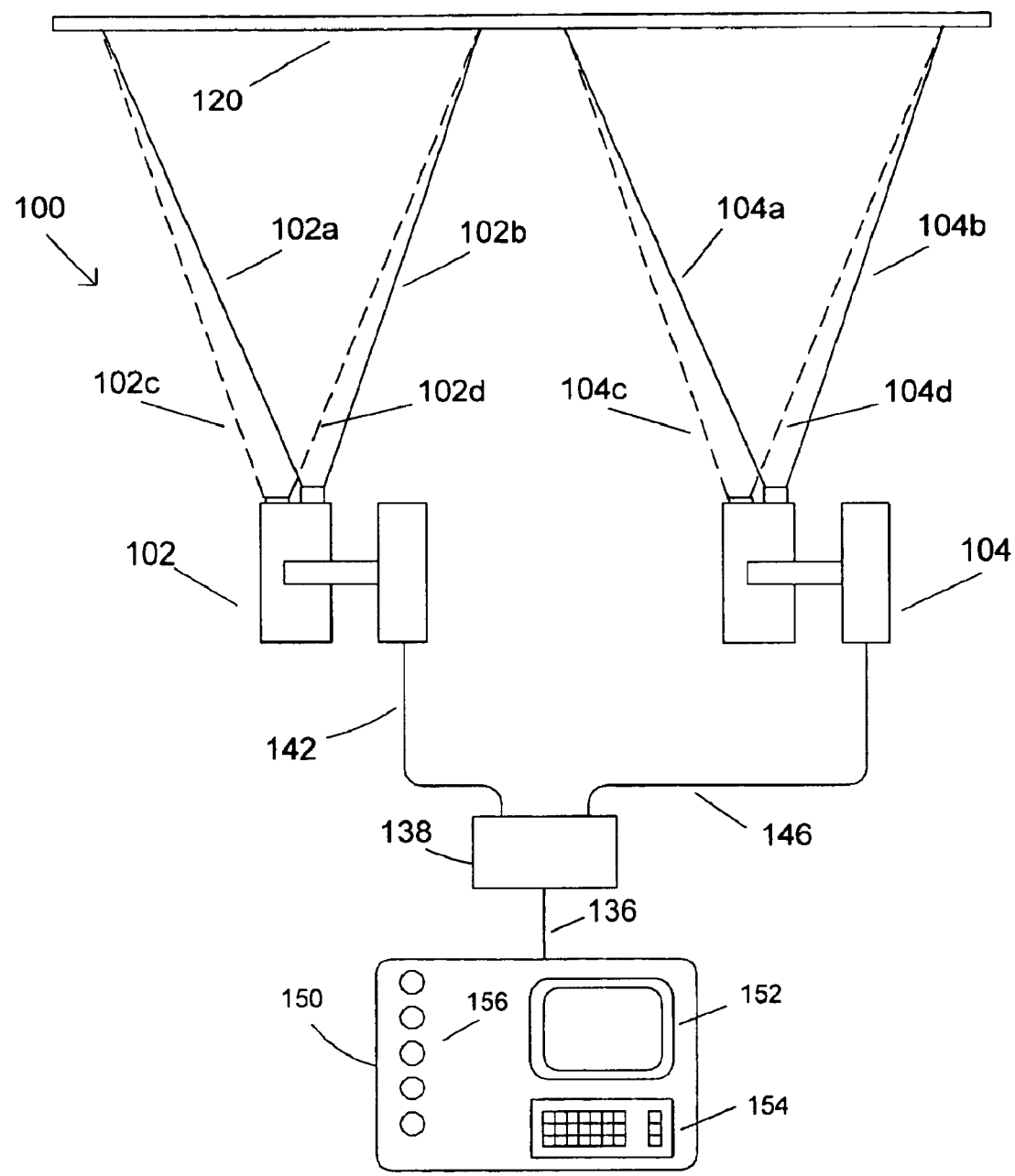
FIG. 2 shows a lighting system in accordance with an embodiment of the present invention.
Figure 3:
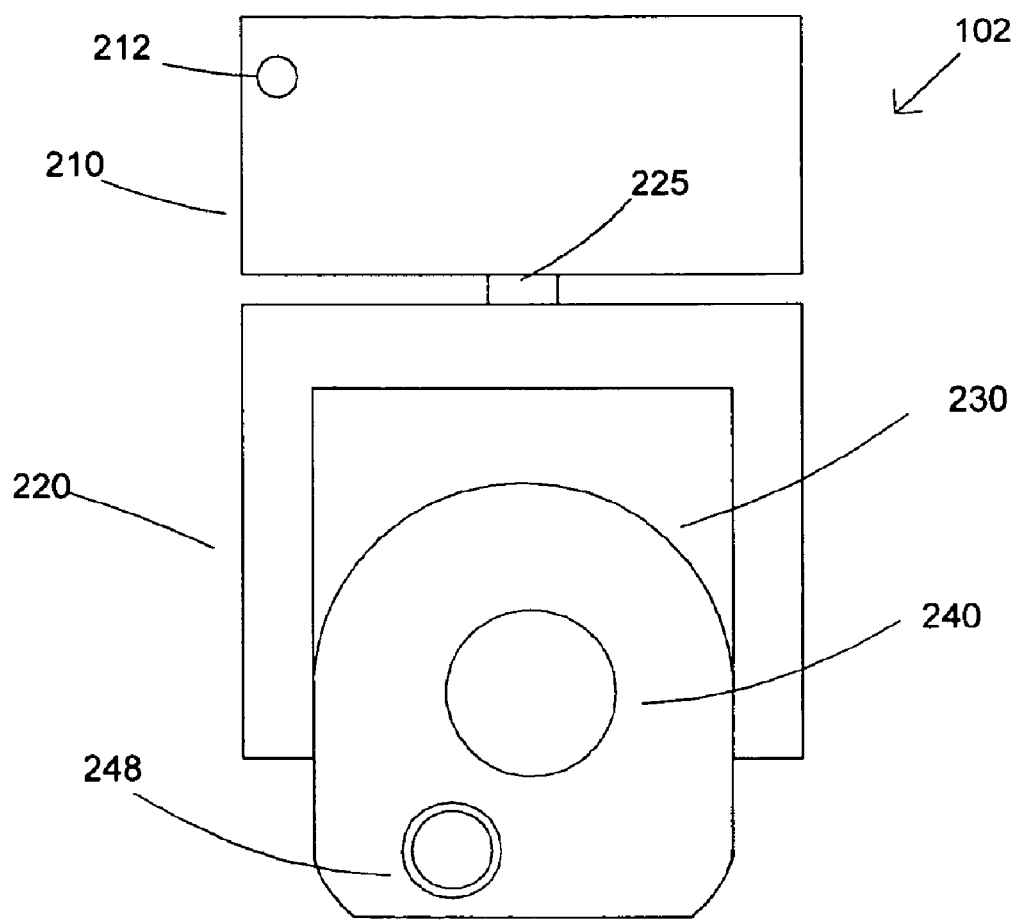
FIG. 3 shows an image projection lighting device in accordance with an embodiment of the present invention including a base housing and a lamp housing.
Figure 4:
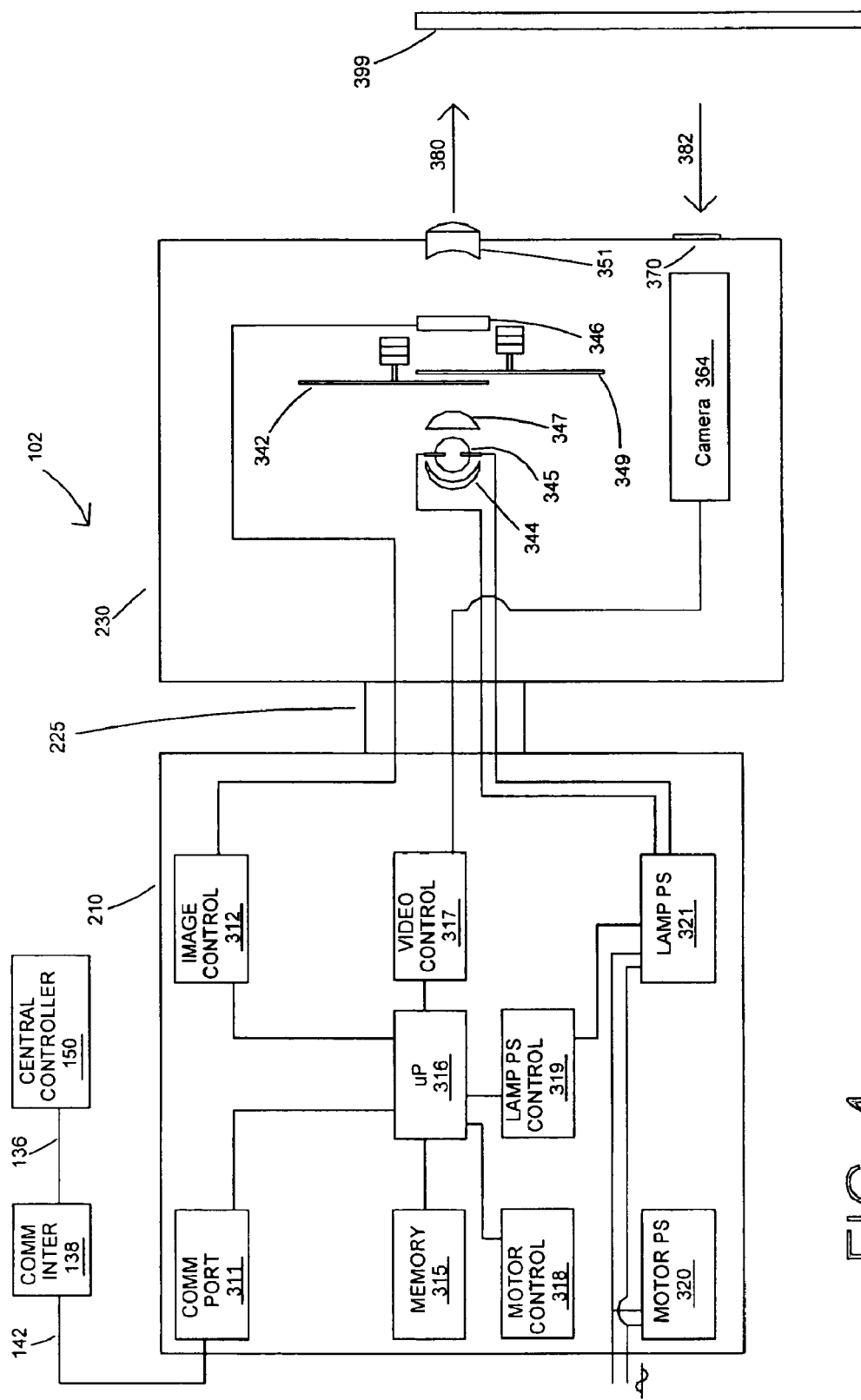
FIG. 4 shows a block diagram of components inside the base housing and the lamp housing of FIG. 3.

FIG. 2 shows a lighting system 100 in accordance with an embodiment of the present invention. The lighting system 100 is comprised of IPLDs 102 and 104, a communications interface 138, and a central controller 150. FIG. 3 shows the image projection lighting device 102 of an embodiment of the present invention for use with the lighting system 100 The IPLD 102 includes a base or electronics housing 210, a yoke 220, and a lamp housing 230. The IPLD 104 of FIG. 2 may have the same components and be identical to the IPLD 102 shown by FIG. 3. FIG. 4 shows a block diagram of components inside the base housing 210 and the lamp housing 230 of FIG. 3.

The base housing 210 of the IPLD 102 includes a connection point 212 shown in FIG. 3 for electrically connecting a communications line, such as communications line 142 shown in FIG. 2. As shown in FIG. 3, the yoke 220 is physically connected to the housing 210 by a bearing 225 which allows the yoke 220 to pan or rotate in relation to the electronics housing 210. The lamp housing 230 is connected to the yoke 220, so that the lamp housing 230 can rotate with respect to the yoke 220 The lamp housing 230 typically contains optical components. An exit aperture 240 is shown for projecting light from a projection lamp, such as lamp 345, shown in FIG. 4, inside the lamp housing 230. The projection lamp 345 in FIG. 4, is shown as a single lamp but it is known in the prior art to use two or more projection lamps working as a single projection lamp. An aperture 248 is shown for allowing a camera 364 shown in FIG. 4, within the lamp housing 230 to receive and capture images. The camera aperture 248 is positioned fairly close to the light projection exit aperture 240 in the lamp housing 210 so that when the camera images the projected light from a projection surface as projected by the IPLD 102, the camera 364, will be capturing images within the camera field, such as the field defined by lines 102c and 102d of FIG. 2 very close to the center of the projected image, such as projected image defined by lines 102a and 102b of FIG. 2. In general the distance from the IPLD, such as 102, to the projected image, such as on projection surface 120, can typically be three to ten meters.

FIG. 2 shows a lighting system 100 of an embodiment of the present invention with two IPLDs 102 and 104 that incorporate a method of video feedback on the projection surface 120. The projection surface 120 may be a stage or a screen. The projection surface 120 may be part of the theatrical set or even a performer.

The IPLDs 102 and 104 are electrically connected by communications lines 142 and 146 respectively and to the communications interface 138. The communications interface 138 is electrically connected to the central controller 150 by communications line 136. The central controller 150 may be a dedicated control console or a personal computer system. The central controller 150 may contain a visual display device such as a monitor 152. The central controller 150 has a keyboard 154 and an array of input knobs or switches 156 for inputting commands by an operator.

Two IPLDs 102 and 104 are shown for simplification, although many more IPLDs such as for example thirty IPLDS each one like any one of 102 and 104 could be used in a lighting system or apparatus, such as apparatus 100. The communications interface 138 may be a router or hub as known in the communications art. The communication system may or may not require a router or a hub.

IPLD 102 shows solid lines 102a and 102b establishing a projection field on the projection surface 120. IPLD 104 shows solid lines 104a and 104b establishing a projection field on the projection surface 120. The projection field defines where the projected image occurs on the projection surface 120. Dashed lines 102c and 102d establish a camera field of a camera 364, shown in FIG. 4, of the IPLD 102 on the projection surface 120 for IPLD 102. The camera field determines the location of the captured images of the camera, such as the camera 364, on the projection surface 120. Dashed lines 104c and 104d establish a camera field on the projection surface 120 for IPLD 104. The camera field, established by lines 104c and 104d, determines the location of the captured images of the camera for IPLD 104 which may be identical to camera 364 of IPLD 102, on the projection surface 120. The two IPLDs, 102 and 104, of the invention are shown in FIG. 1 physically set up to produce video feedback. The cameras of IPLD 102 and IPLD 104 are shown capturing images of their respective projection fields on the projection surface 120. Since in video feedback the camera, such as camera 364, is continually capturing the projected image on the projection surface as defined by lines 102a and 102b with the rotational angle of the image on the projection surface different each time the feedback is called a loop.

FIG. 4 shows block diagram showing components within or part of the base housing 210 and within or part of the lamp housing 230 of the IPLD 102. FIG. 4 also shows the central controller 150. The components within or part of the base housing 210 include a communications port (shown as "comm port") 311, image control 312, memory 315, microprocessor or processor 316, video control 317, motor control 318, lamp power supply control 319, motor power supply 320 and lamp power supply 321. The components within or part of the lamp housing 230 include a filter assembly 342, a mirror 344, a projection lamp or projection light source 345, a light valve 346, a condensing lens 347, a filter assembly 349, a focusing lens 351, a camera 364, and an aperture 370.

The central controller 150 outputs address and control commands over a communications system which may include communications interface 138 of FIG. 2. The communications interface 138 is connected to the communications port 311 by communications line 142 as shown in FIG. 4. The image control 312 of the electronics housing 210 provides control signals to the light valve 346 in the lamp housing 230. The microprocessor 316 in the electronics housing 210 provides control signals to the image control 312. The image control 312 can be controlled by the microprocessor 316 to electronically rotate an image that is produced by the light valve for projection on the projection surface 399. The microprocessor 316 is shown electrically connected to the memory 315. The memory 315 stores the computer software operating system for the IPLD 102 and possibly different types of content as well as modified projection images used to form images at the light valve 346 of the lamp housing 230. The light valve shown as 346 is a transmissive type light valve where light from the projection lamp 345 is directed to the light valve 346 to be transmitted through the light valve 346 to the lens 351. As known in the prior art a light valve can be a reflective light valve where light from a projection lamp, such as lamp 345 is directed to a light valve, such as light valve 346 to be reflected from the light valve 346 to the lens 351.

The motor control 318 is electrically connected to motors. The electrical connection to the motors is not shown for simplification. The motors may be stepping motors, servomotors, solenoids or any other type of actuators. The motor control 318 provides the driving signals to the motors used with filter assemblies 342 and 349 and for pan and tilt motors (not shown). Filter assemblies 342 and 349 may be rotatable aperture wheels as known in the art. The aperture wheels, if used for filter assemblies 342 and 349, may be used to vary color or pattern parameters.

The motor control 318 is electrically connected to receive control signals from the microprocessor 316. Two power supplies are shown in FIG. 4. A motor power supply 320 is shown for supplying energy to the motors and a lamp power supply 321 is shown for supplying power to the main projection light source or lamp 345. A lamp power supply control interface 319 is electrically connected to the microprocessor 316 to receive control signals from the microprocessor 316 and signals are sent from the lamp power supply interface 319 to the lamp power supply 321 for controlling the main projection light source or lamp 345.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 399 from focusing lens 351 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

The window aperture 370 of the lamp housing 230 is shown in FIG. 4, for allowing input light for the reception of images traveling in the direction of arrow 382 from the projection surface 399 to the camera 364. The camera 364 may be a type of camera known in the art such as a device that receives light images with a contained camera sensor and converts the light images into electronic image data or signals. The camera 364 may be of a type, as known in the art, which may be constructed of only a camera sensor or the camera 364 may contain other optical components in the camera sensor optical path along with suitable control electronics that may function to zoom and focus the camera. The projection lamp 345 has its light energy collected by the collecting mirror 344 and a condensing lens 347. The collected light from the projection lamp 345 passes through the condensing lens 347. Next the light passes though filter assemblies 342 and 349. The light then passes through the light valve 346 and the focusing lens 351 and travels in the direction of the arrow 380.

The video control interface 317 of the electronics housing 210 sends image data or signals as received from the camera 364 to the microprocessor 316. The video control interface may also send commands to the camera for adjustment of focus, zoom, iris, white balance and special effects. The video control interface may also be capable of electronically rotating the captured image that has been captured by the camera before sending the captured image data to the microprocessor 316. The microprocessor 316 may send this image data or signals to the communications port 311 for transmission back to the central controller 150 or to other IPLDs on the communications system or lighting system or apparatus 100, such as IPLDs 102 or 104 connected to communication interface 138 in FIG. 2. The communications port 311 may be a part of the processor 316, the communications port 311 can be any device capable of receiving the communication sent over the communications system. The communications received by the communications port may be wired or wireless. The camera 364 may be sensitive to infrared light, to visible light, or both. The other IPLDs on the network or lighting system or apparatus 100, such as IPLDs 102 and 104, may use the image data received from the IPLD 102 by projecting the images that were captured by the camera 364 and thus originated at IPLD 102.

The IPLD 102 of one or more embodiments of the present invention contains a video image control 312 of FIG. 4 which is capable of rotating the projected image. The video image control 312 may contain an image processing system to allow the captured video image to be rotated electronically. The image may be rotated incrementally to a desired angle or continuously rotated. One example of an IPLD, that rotates the projected image electronically is the Catalyst (trademarked) system available from High End Systems, Inc. of Austin, Tex., and is described in the Catalyst (trademarked) system brochure. A video card used in a computer server for the Catalyst (trademarked) system operates with the Catalyst (trademarked) operating software to electronically rotate images that are supplied by the memory in the server and then are projected by a projector. In this way the projected image is rotated electronically and a physical rotation of the projector or the projected image is not required. The preferred way of rotating the image is electronically rotating the projected image. It would also be possible to electronically rotate the camera image to produce useable video feed back art however the rotation of the projected image allows standard content such as still and video images to be rotated also. Finally, it is possible to physically rotate the camera optical image or the camera itself by means of a motor except this would create more necessary mechanical components.

Figure 5:
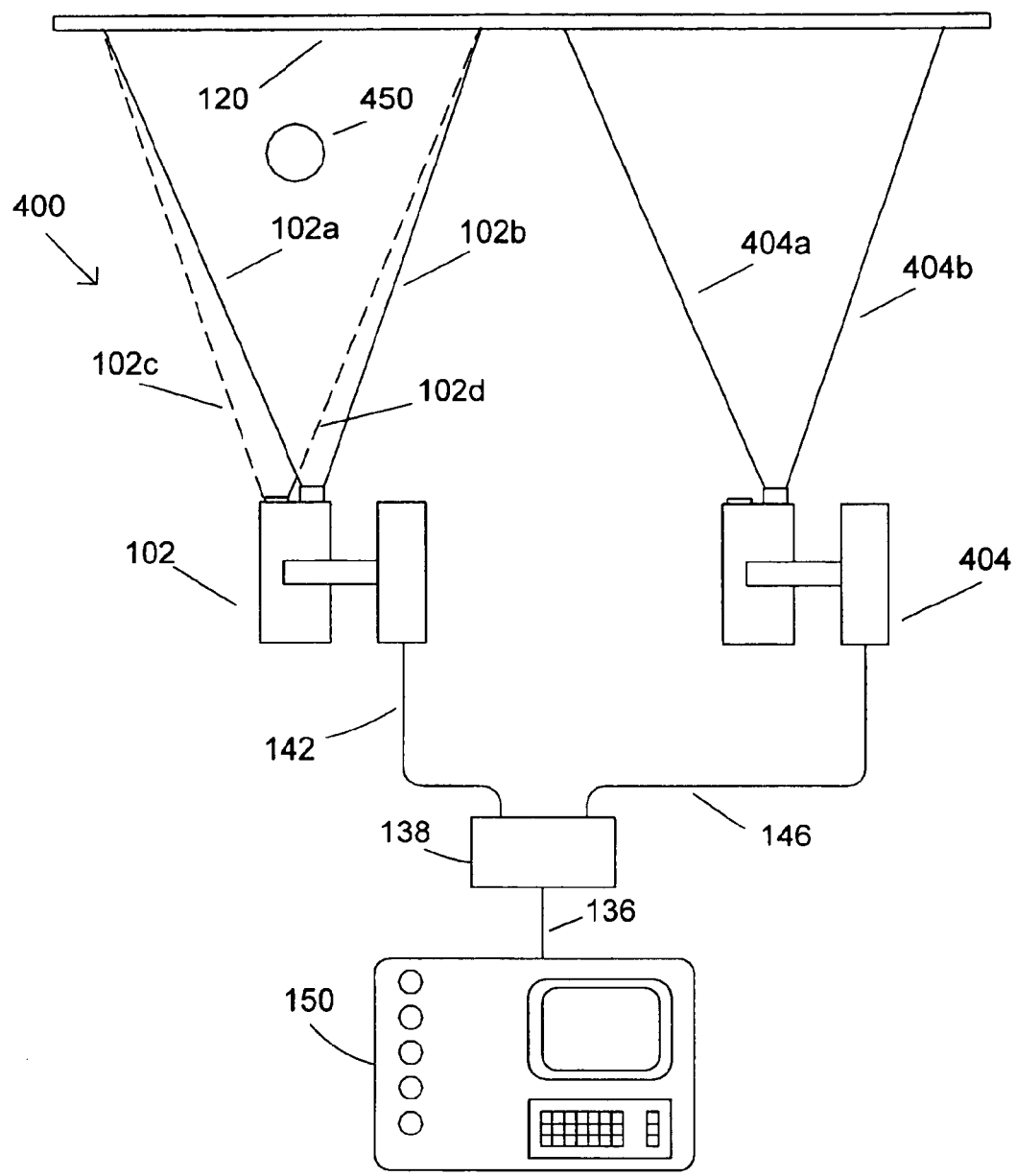
FIG. 5 shows a lighting system of another embodiment of the present invention.

FIG. 5 shows an apparatus 400 which is comprised largely of the same components as FIG. 2, however, the IPLD 404 has replaced IPLD 104 and the IPLD 404 is projecting video feedback art as created by IPLD 102. The projection field for the IPLD 404 is established by solid lines 404*a* and 404*b*. A performer (shown as circle 450) is located in front of the projection surface 120 between the camera and projection fields (established by dashed lines 102*a* and 102*b* and solid lines 102*c* and 102*d* respectively) on the projection surface 120 and the IPLD 102 itself.

The IPLD 102 creates video feedback art by electronically rotating its projected image, as defined by projection lines 102*a* and 102*b*, on the projection surface 120 while at the same time capturing the rotated image, as shown by image lines 102*c* and 102*d*, with the integral camera 364 and projecting that image as a second image that is at a different rotational angle then the first image on the projection surface. The performer 450 is located between the projection surface 120 and the IPLD 102 and has now been incorporated into the video feedback art created by the IPLD 102.

The video feedback art created by IPLD 102 in its electronic data or signal form is sent by the IPLD 102 over the communications system by transmitting the video feedback images as captured by the camera 364 from the communications port 311 of FIG. 4 to other IPLDs such as IPLD 404. The initiation of the transmission of the video feedback art data over the communications system from IPLD 102 can be at the command of an operator of the control system or controller 150 of FIG. 2. The operator of the central controller 150 of FIG. 2 first inputs the address of a particular IPLD of the lighting system 100 the operator wishes to command. This is done by the operator entering a correct numerical address into the keyboard 154 or with the input knobs or switches 156 as known in the art. The address of the desired IPLD is sent over the communication system which is comprised of communication lines 136, 138, 142 and communication interface 138. The IPLDs of the lighting system 100 all receive the address sent by the operator of the control system 150 and compare the received address to the operating address contained in the memory, such as memory 315 for IPLD 102, of the IPLDs as known in the art. The address sent by the central controller 150 over the communication system is received by the communications port 311 of FIG. 4. The communications port 311 transmits the address data to the processor 316 where it is compared to the operating address, contained in the memory of the IPLD, such as an operating address for IPLD 102 contained in the memory 315. If the address sent by the operator of the central controller 150 over the communication system matches the operating address of the desired IPLD (IPLD 102 for example) the IPLD is next ready to respond to commands sent by the operator of the central controller 150 as known in the art. When an IPLD is sent the correct address by the operator of the central controller 150 to enable the IPLD to accept commands it has been selected by the operator.

The operator desiring to produce the video feedback of one or more embodiments of the present invention commands the camera 364 of FIG. 4 of the selected IPLD 102 to capture the projected image on the projection surface 120 and to affect the electronic rotational angle of the projected image, which is currently defined by lines 102a and 102b shown in FIG. 5. The camera of IPLD 102 continues to capture the projected image that has been rotated and the IPLD projects that captured image as a second image that has a different rotational angle on the projection surface than the first image to obtain the desired video feedback loop. Once the video feedback effect has been created the operator may next command the IPLD 102 to send the captured camera image data to the communications port 311 of FIG. 4. The video control 317 transmits the captured camera image data to the processor 316 where it is formatted as necessary to be sent to the communications port 311 for broadcast over the communications system. The operator of the central controller 150 may command the IPLD 102 to send the video feedback data from the IPLD 102 to the IPLD 404 of FIG. 5. The sending of captured camera images in a lighting system is explained in detail in my pending application publication no. 2002/0093296, Ser. No. 10/090,926, filed on Mar. 4, 2002, incorporated herein by reference.

In FIG. 5 a performer 450 is shown in the camera field defined by lines 102c and 102d, and the projection field defined by lines 102a and 102b, between the projection surface 120 and the IPLD 102. The performer in this way is interactive in the video feedback loop and motions or movement by the performer will effect the generation of the video feedback image. The performer is an interactive part of the video feedback. In FIG. 5 the video feedback created by the performer and the IPLD 102 is also transmitted to IPLD 404 and two identical video feedback images are created side by side on the projection surface 120. The area of one of the video feedback images is defined by the lines 404a and 404b and the area of the other video feedback image is defined by lines 102a and 102b.

Figure 6:
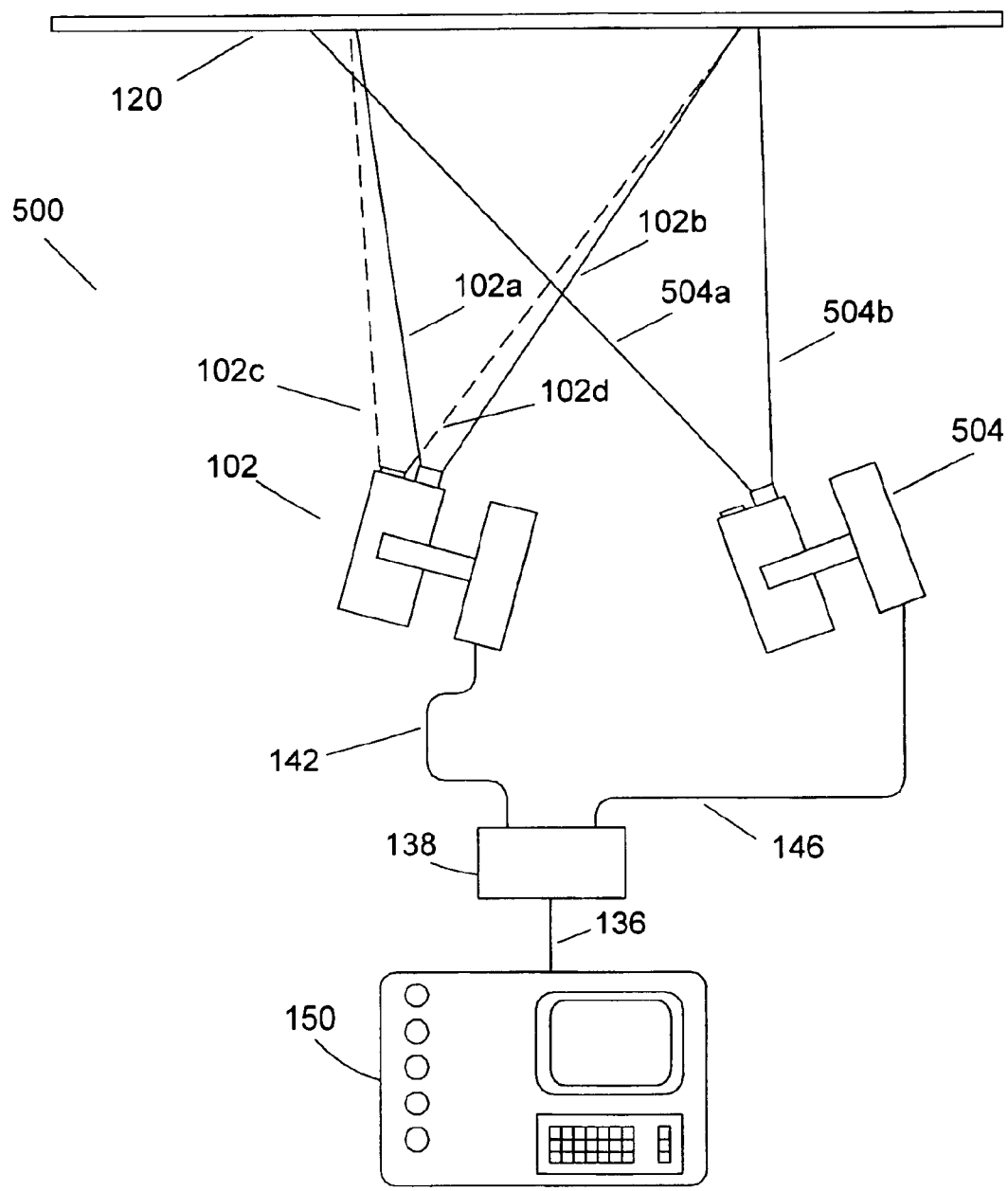
FIG. 6 shows a lighting system of another embodiment of the present invention.

FIG. 6 shows the same components of FIG. 2, however, IPLD 504 (in place of IPLD 104) is now shown positioned to projected images onto the projection field, established by lines 102 and 102b, on the projection surface 120 from IPLD 102. The projection field by IPLD 504 is established by solid lines 504a and 504b. IPLD 102 is shown creating video feedback art as in FIG. 2 with the integral camera capturing the projection field on the projection surface 120. The IPLD 504 is shown projecting its image, defined by lines 504a and 504b onto the projected image projected by IPLD 102 defined by 102a and 102b. IPLD 504 may be projecting an image from the content of its memory, which may be similar to or the same as memory 315 of FIG. 4 or it may be projecting an image from content sent over the communication system from the central controller 150. The IPLD 504 may also be projecting an image as sent by another IPLD over the communication system such as IPLD 102. Images projected by 504 will also be captured by the camera 364 of FIG. 4 of the IPLD 102 and incorporated into the video feedback loop. As the images that are projected by IPLD 504 change visually, the video feedback projection created by IPLD 102 also changes since the images that IPLD 504 projects are incorporated into the video feedback loop of IPLD 102. This is because the integrated camera 364 of the IPLD 102 captures both the projection field, defined by lines 102a and 102b, of IPLD 102 on the projection surface 120 as well as the projection field, defined by lines 504a and 504b of the IPLD 504 on the projection surface 120.

With the invention the desired video feedback art is created by the IPLD integral camera, such as camera 364, and with the electronic rotation of the projected image. The electronic rotation of images by using an image control device such as a video card is known in the art. Many video cards for personal computers as are used to rotate an image on a display screen to obtain a portrait mode for the monitor. The image control 312 of FIG. 4 may be a video card that can electronically rotate an image and supply the driving signals to the light valve 346. By using the electronic rotation of the projected images it is not necessary to physically rotate the camera 364 or physically rotate the projected image with a dove prism for example. The projected image content may only be the captured camera image of the projection surface 120 or the projected image may be of some content stored in the memory, such as memory 315, of the IPLD or content received over the communications system.

Instead of electronically rotating the projected image with the image control 312 of FIG. 4 it is possible to electronically rotate the captured camera image after it has been captured by the camera. The video control 317 may also have the capability to receive the captured camera image data and process that image data to output an image with an adjustable rotational angle to be sent to the processor 316 for sending to the image control 312 that in turn sends the appropriate driving signals to the light valve 346. The camera captured image may be rotated incrementally to a desired angle or continuously rotated. It could also be possible to use the processor 316 to process the captured camera image to provide a rotated image of the captured camera image if the video control 317 did not have the capability of rotating the camera captured images. The IPLD 102 of one or more embodiments of the present invention may be capable of both electronic rotation of the projected image and the camera image independently. I.e. the projected image defined by lines 102a and 102b in FIG. 2 can be electronically rotated or the camera captured image defined by lines 102c and 102d can be electronically rotated. There is a preferred advantage to the capability of electronic rotation of the camera image and electronic rotation of the projection image. For example content stored in the memory 315 or sent over the communications system may be rotated by the image control 312 and projected onto the projection surface 399 of FIG. 4 or projection surface 120 of FIG. 2. The camera 364 can capture images of the projection surface 120 and have those images rotated by the video control 317 in an opposing direction to the direction of the rotating projected images. Next the captured camera rotating images can also be projected along with the content images simultaneously (mixed) so that the content images that are not produced by the camera rotate in one direction while the captured camera images rotate in the other direction.

The rotation of camera images can be controlled by commands sent from the central controller, such as controller 150, over the communication system to the IPLD, such as IPLD 102. The IPLD 102 may also send captured camera images with the incorporated change of rotation angle over the communications system, such as including communications interface 138 and cables 136, 142 and 146 to other IPLDs on the communications system or to the central controller 150.

Figure 7:
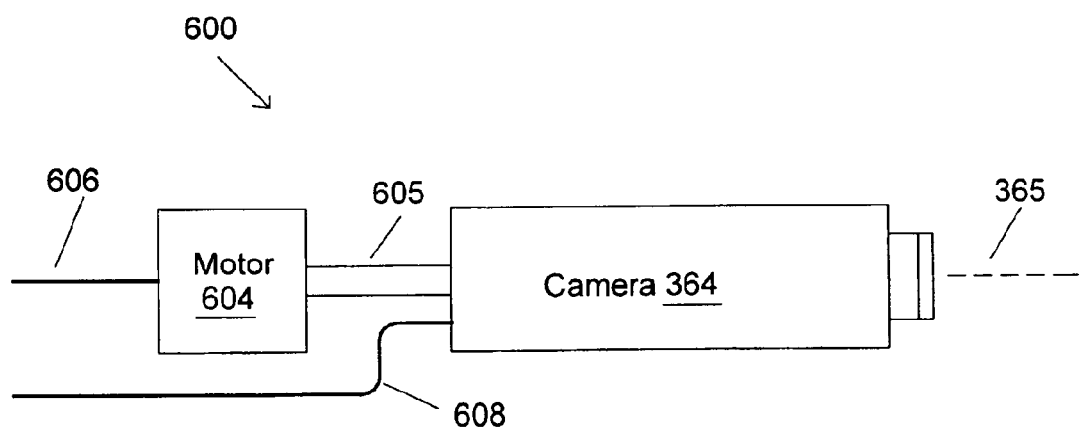
FIG. 7 shows a mechanical system for use in accordance with an embodiment of the present invention that includes a camera that is connected to a motor actuator by motor shaft.

The camera 364 itself can also be rotated mechanically instead of just rotating the captured camera images electronically. FIG. 7 shows a mechanical system 600 that includes camera 364 that is connected to a motor actuator 604 by motor shaft 605. The motor shaft 605 is attached to the camera 364 in any suitable way as to allow camera rotation on the axis 365 (the optical axis of the camera 364) as the motor shaft 605 is turned by the motor 604. The motor electrical connection 606 would be connected to the motor control interface 318 of FIG. 4 so that the processor 316 can send control signals to the motor control interface 318 of FIG. 4. The motor control interface 318 in turn sends driving signals to the motor wiring 606 (connection not shown) to the motor 604 that rotates the camera 364 about its optical axis 365. The camera wiring is shown as 608 and its connection to the video controller 317 of FIG. 4 is not shown for simplification. The operator of the central controller 150 of FIG. 2 can then send commands over the communication system to an IPLD such as IPLD 102 that controls the motorized camera rotation system such as system 600 of FIG. 7. The operator may command from the central controller 150 the rotation of the camera at the IPLD, such as IPLD 102, and the camera 364 may be controlled to continuously rotate or rotate incrementally to any specific rotational angle. Another method or rotating the camera image mechanically involves the use of a dove prism. A dove prism can be rotated in front of the camera optical path by a motor that is controlled much the same way as the motor that rotates the camera. The use of a dove prism with a motor to rotate an image is will known in the field of optics.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A lighting apparatus comprising a base, the base comprising a communications port;

the lighting apparatus further comprising a yoke; and a lamp housing, the lamp housing comprising a light valve and a camera;

wherein the light valve is used to project a projected image onto a projection surface;

wherein the base, and the yoke are coupled so that the yoke can rotate with respect to the base;

wherein the lamp housing and the yoke are coupled so that the lamp housing can rotate with respect to the yoke;

wherein the camera captures at least a portion of the projected image on the projection surface as a captured image;

wherein the captured image is rotated to a desired orientation by a command received at the communications port; and wherein the rotated captured image is projected onto the projection surface to create video feedback art comprised of a series of projected images.

2. The lighting apparatus of claim 1 wherein the captured image is rotated electronically.

3. The lighting apparatus of claim 1 further comprising a memory; and wherein content from the memory is mixed into the video feedback art.

4. The lighting apparatus of claim 1 further comprising mixing content as provided over the communications system into the video feedback art.

5. A lighting apparatus comprising a base, the base comprising a communications port the lighting apparatus further comprising a yoke; and a lamp housing, the lamp housing comprising a light valve and a camera;

wherein the light valve is used to project a first image onto a projection surface;

wherein the base, and the yoke are coupled so that the yoke can rotate with respect to the base;

wherein the lamp housing and the yoke are coupled so that the lamp housing can rotate with respect to the yoke;

wherein the camera captures at least a portion of the first image as projected onto the projection surface as a first captured image;

wherein the first captured image is rotated to a desired orientation by a command received at the communications port;

wherein the rotated first captured image is projected onto the projection surface as a second projected image;

wherein the first projected image has an orientation and the second projected image has an orientation, and the orientations of the first and the second projected images are different; and wherein the first captured image is rotated by a command sent from a central controller over a communications system to a first image projection lighting device by an operator of the central controller in response to an artistic requirement to create video feedback art comprised of a series of projected images.

6. The lighting apparatus of claim 5 wherein the first captured image is rotated electronically.

7. The lighting apparatus of claim 5 wherein the communications port transmits the first image and the second image over a communications system.

8. An image projection lighting device comprising
a base, the base comprising a communications port
the image projection lighting device further comprising
a yoke;
and a lamp housing, the lamp housing comprising a light valve and a camera;
wherein the light valve is used to project an image onto a projection surface;
wherein the base, and the yoke are coupled so that the yoke can rotate with respect to the base;
wherein the lamp housing and the yoke are coupled so that the lamp housing can rotate with respect to the yoke;
wherein the camera captures a first captured image of the projection surface;
wherein the camera has an optical axis;
wherein the camera is physically rotated on the optical axis to a desired orientation by a command received via the communications port; and
wherein the command is initiated by an operator.

9. A lighting system comprising
a plurality of image projection lighting devices including a first image projection lighting device;
a central controller;
a communications system;
wherein the first image projection lighting device is comprised of
a base, the base comprising a communications port
the first image projection lighting device further comprised of
a yoke; and
a lamp housing, the lamp housing comprising a light valve and a camera
wherein the light valve is used form a first projected image onto a projection surface;
wherein the base, and the yoke are coupled so that the yoke can rotate with respect to the base;
wherein the lamp housing and the yoke are coupled so that the lamp housing can rotate with respect to the yoke;
wherein the camera of the first image projection lighting device captures at least a portion of the first projected image to form a captured image;
wherein the captured image is rotated to an angle of orientation by a command sent from the central controller over the communications system to the first image projection lighting device;
wherein the captured image is formed by the light valve to produce a second projected image;
wherein the first projected image and the second projected image are projected on to the projection surface at different rotational angles of orientation;
wherein the first projected image and the second projected image are projected simultaneously creating a video feedback art;
and wherein the command is determined by an operator of the central controller.

10. The lighting system of claim 9 further wherein the first image projection lighting device has a memory which includes content;
and wherein the first image projection lighting device mixes content from the memory into the video feedback art.

11. The lighting system of claim 9 further wherein the first image projection lighting device mixes content as provided from the communications system into the video feedback art.

* * * * *